UNITED STATES PATENT OFFICE.

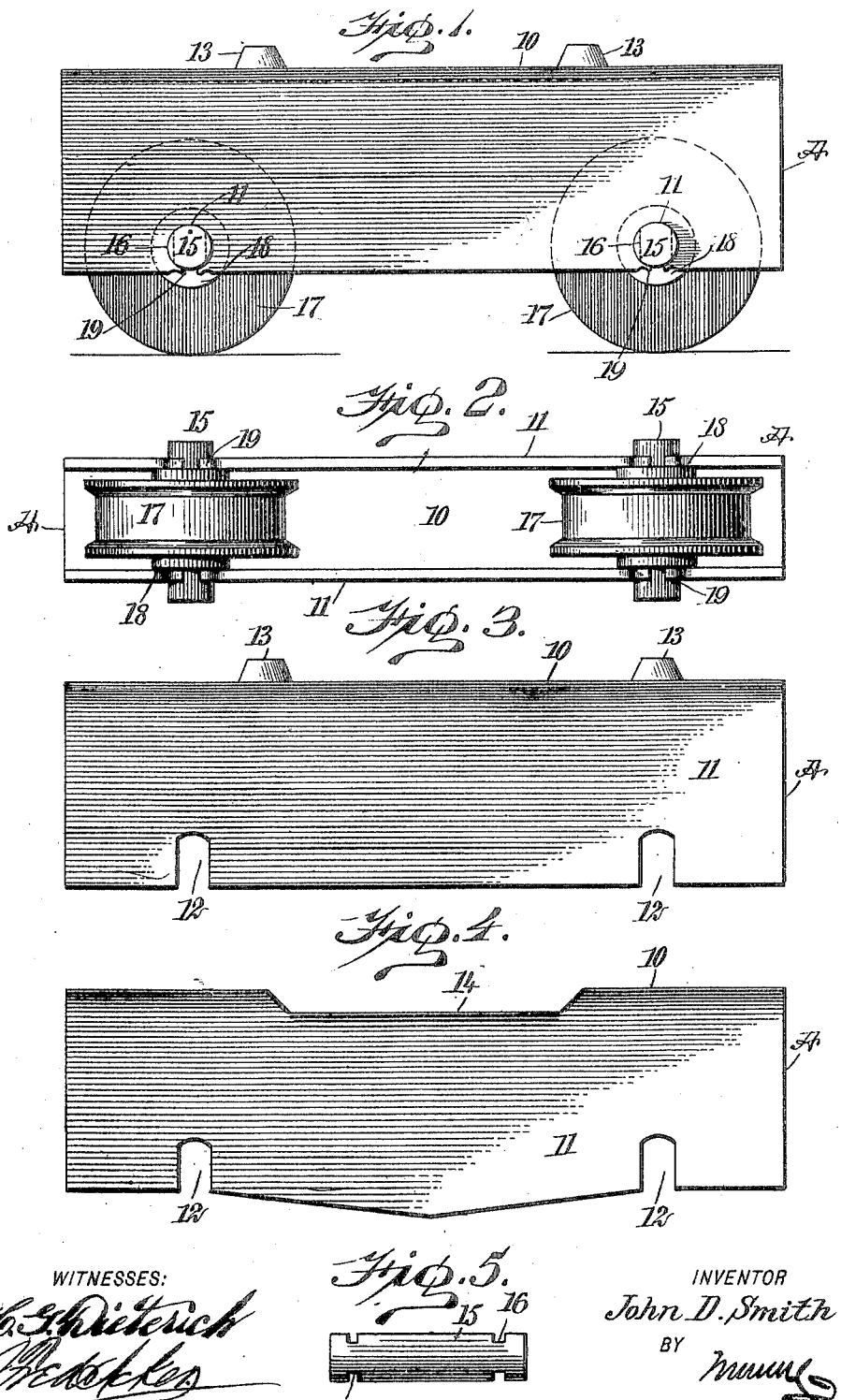

JOHN D. SMITH, OF CHERAW, SOUTH CAROLINA, ASSIGNOR OF ONE-HALF TO PEE DEE IRON WORKS, OF CHERAW, SOUTH CAROLINA.

TRUCK.

No. 811,965.            Specification of Letters Patent.            Patented Feb. 6, 1906.

Application filed August 23, 1905. Serial No. 275,410.

*To all whom it may concern:*

Be it known that I, JOHN D. SMITH, a citizen of the United States, and a resident of Cheraw, in the county of Chesterfield and State of South Carolina, have invented a new and Improved Truck, of which the following is a full, clear, and exact description.

My invention relates to trucks especially adapted for handling lumber in mills and elsewhere; and the purpose of the invention is to provide a truck in which the frame is in one piece, and, further, in which the axles are of such construction as to act as braces and spreaders for the frame as well as axles.

A further purpose of the invention is to provide a truck of the character described which will be simple, durable, and economic and in the construction of which no bolts are required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved truck. Fig. 2 is a bottom plan view of the truck. Fig. 3 is a side elevation of the frame of the truck. Fig. 4 is a side elevation of a slightly-modified form of the frame, and Fig. 5 is a plan view of the axle for the truck.

A represents the body of the truck, which is made of sheet-iron of suitable thickness, and the said body is in one piece, comprising an upper substantially flat member 10 and two downwardly-extending vertical side members 11. In the lower edge of the side members 11 of the body, adjacent to the ends thereof, transversely-alining vertical openings 12 are produced, the side walls whereof are straight, and preferably the upper walls are more or less concaved, as shown particularly in Figs. 3 and 4. Offsets or lugs 13 are usually struck up from the upper member 10 of the body at each side of its longitudinal center, and the timber carried is adapted to rest on the body between its lugs or offsets 13; but instead of employing the lugs or offsets 13 the upper member 10 may be provided with a central depression 14, as is shown in Fig. 4, at which depression the timber rests, so that it will not shift laterally when on the truck.

In Fig. 5 I have illustrated an axle 15 as attached to the body A. This axle 15 is provided adjacent to each end with vertical grooves 16, and when the axles are placed in the body at the bottom they are made to enter the openings 12, and the side walls of the said openings are received in the side grooves 16 in the axle. When an axle is in position, the lower edges of the openings 12 are struck with a suitable tool, so as to form tongues 19, extending in direction of each other beneath the axles at the slots of the body, as is shown in Fig. 1, thus retaining the axles in place in the body; but the axles may be held in the body in any other suitable manner. Each axle 15 is provided with a wheel 17, loosely mounted thereon, and the said wheels are peripherally grooved, so that they may travel on a track. Each wheel 17 is provided with a washer 18, located between its hub and the frame, in order to practically fill up the space between the sides of the wheel and the opposing sides of the body A, as is particularly shown in Fig. 2.

A truck constructed as above described is exceedingly simple, durable, and economic and will fully answer all the purposes for which it is intended as well as the more expensive and complicated trucks ordinarily employed.

Having thus described my invention, I claim as new and desire to secure by Letters Patent—

1. A truck comprising a body constructed of a single piece of material bent upon itself to form an upper section and downwardly-extending side sections, the side sections being provided with transversely-alined openings, an axle provided with grooves for receiving the side walls of the openings, and wheels loosely mounted on the axle within the said body.

2. In a truck, a body constructed of one piece of sheet metal, comprising an upper section having guides for the articles carried, and downwardly-extending side members provided with openings in their lower edges, the said openings being in transverse alinement, and axles introduced into the said openings, which axles have grooves in their sides receiving the side walls of the said openings, and wheels mounted loosely on the said axles within the said body.

3. In a truck, the combination with a body constructed of one piece of metal bent upon itself to form a top section having a guide for the material to be carried, and downwardly-extending side sections having vertical slots in their lower edges adjacent to the ends of the sides, transversely-opposing slots being in transverse alinement, axles provided with grooves in opposite sides at their ends, which grooves are adapted to receive the side walls of the openings in the body, the lower edges of the side walls of the said openings being projected beneath the said axles, and wheels loosely mounted on the said axles within the body, the washers of said wheels extending practically to the side members of the body, as set forth.

In testimony whereof I have signed my name to this specification in the presence of two subscribing witnesses.

JOHN D. SMITH.

Witnesses:
W. T. POWELL,
H. M. DEWARE.